United States Patent
Mednik et al.

(10) Patent No.: US 9,337,725 B2
(45) Date of Patent: May 10, 2016

(54) OUTPUT CURRENT CONTROL IN A BOUNDARY CONDUCTION MODE BUCK CONVERTER

(71) Applicant: Microchip Technology, Inc., Chandler, AZ (US)

(72) Inventors: Alexander Mednik, Campbell, CA (US); Simon Krugly, Sunnyvale, CA (US); Marc Tan, Sunnyvale, CA (US)

(73) Assignee: Microchip Technology Inc., Chandler, AZ (US)

( * ) Notice: Subject to any disclaimer, the term of this patent is extended or adjusted under 35 U.S.C. 154(b) by 255 days.

(21) Appl. No.: 13/947,894

(22) Filed: Jul. 22, 2013

(65) Prior Publication Data

US 2015/0022168 A1    Jan. 22, 2015

(51) Int. Cl.

| | |
|---|---|
| *H02J 3/12* | (2006.01) |
| *G05F 1/00* | (2006.01) |
| *H02M 3/335* | (2006.01) |
| *H02M 3/156* | (2006.01) |
| *H02M 3/155* | (2006.01) |
| *H05B 33/08* | (2006.01) |

(52) U.S. Cl.
CPC .............. *H02M 3/156* (2013.01); *H02M 3/155* (2013.01); *H05B 33/0818* (2013.01)

(58) Field of Classification Search
USPC ................ 323/235, 242, 243, 246, 266, 270, 323/274–277, 282–285
See application file for complete search history.

(56) References Cited

U.S. PATENT DOCUMENTS

| | | | |
|---|---|---|---|
| 3,925,688 A * | 12/1975 | Kalfus .......................... 327/452 |
| 6,747,880 B2 * | 6/2004 | Grover ........................ 363/21.06 |
| 7,236,383 B2 * | 6/2007 | Peron ............................. 363/125 |
| 7,616,455 B2 * | 11/2009 | Cameron et al. ................. 363/16 |
| 7,863,836 B2 * | 1/2011 | Mednik et al. ................. 315/360 |
| 8,106,597 B2 * | 1/2012 | Mednik et al. ................. 315/247 |
| 8,675,374 B2 * | 3/2014 | Coleman et al. ........... 363/21.03 |
| 8,907,580 B2 * | 12/2014 | Mednik ..................... 315/209 R |

* cited by examiner

*Primary Examiner* — Adolf Berhane
*Assistant Examiner* — Gary Nash
(74) *Attorney, Agent, or Firm* — Burr & Forman LLP; Ryan M. Corbett

(57) ABSTRACT

A switching power converter has an input voltage source. An output load is coupled to the input voltage source. An inductive element is coupled to the load. A switch is coupled to the inductive element. A control circuit is coupled to the switch and the inductive element for activating and deactivating the switch, the control circuit activating and deactivating the switch based on a negative voltage drop across a resistive element of the control circuit.

15 Claims, 4 Drawing Sheets

OUTPUT CURRENT CONTROL IN A BOUNDARY CONDUCTION MODE BUCK CONVERTER

RELATED APPLICATIONS

The present patent application is related to U.S. Provisional Application Ser. No. 61/714,474, filed Oct. 16, 2012, and entitled, "CURRENT CONTROL IN BOUNDARY CONDUCTION MODE BUCK CONVERTER". The present patent application claims the benefit under 35 U.S.C. §119(e).

BACKGROUND

The present invention, relates generally to power supplies, and, more specifically, to output current control in a boundary conduction mode converter by sensing current in its controlled switch.

Current-programmed control, a scheme in which the output of a switch-mode power supply (SMPS) is controlled by choice of the peak current in a controlled switch, finds wide applications due to its ease of implementation, fast transient response and inherent stability. The peak current in the controlled switch is representative of the average current in inductive elements offset a ripple current amplitude. Ideally, in a boundary conduction mode converter, the average current in its inductive element equals one-half of the peak current. However, due to parasitic elements of the circuit, such as parasitic capacitance of switching and inductive elements, reverse recovery delays of rectifier diodes, controlling the peak current produces an error with respect to the average output current. This error affects the accuracy of the current control loop and diminishes the benefits of the control method.

Due to the above issues, circuits and methods have been designed which eliminate the peak-to-average current sense error in a current-programmed control (CPC) circuit of a boundary conduction mode switching converter. The switching converter receives energy from an input voltage source and delivers this energy to the output load by storing it fully or partially in one or more inductive elements. The energy is directed by periodical switching of two or more switching devices, at least one of which devices being controlled switches. In CPC, the conduction time of the controlled switch is determined by the time required for the current in the inductive element to reach a programmed level. However, in these circuits and methods, an error is contributed by a negative swing of the current in the inductor.

Therefore, it would be desirable to provide a system and method that overcomes the above problems.

SUMMARY

A switching power converter has an input voltage source. An output load is coupled to the input voltage source. An inductive element is coupled to the load. A switch is coupled to the inductive element. A control circuit is coupled to the switch and the inductive element for activating and deactivating the switch, the control circuit activating and deactivating the switch based on a peak voltage drop across a resistive element of the control circuit, both of positive and of negative polarity.

A switching power converter has an input voltage source. An output load is coupled to the input voltage source. An inductive element is coupled to the load. A switch is coupled to the inductive element. A control circuit is coupled to the switch and the inductive element for activating and deactivating the switch. The control circuit activates the switch when a zero-voltage condition is detected at the switch and deactivates the switch when a current sense signal in a resistive element of the control circuit exceeds a reference voltage (RF). The reference voltage (REF) is further corrected based on a negative voltage drop across the resistive element of the control circuit.

A power converter has an input voltage source. A output load is coupled to the input voltage source. An inductive element is coupled to the load. A switch is coupled to the inductive element. A resistive element is coupled to the switch. A sample and hold circuit is coupled to the resistive element. A zero voltage detector (ZVD) circuit is coupled to the switch and sample and hold circuit.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
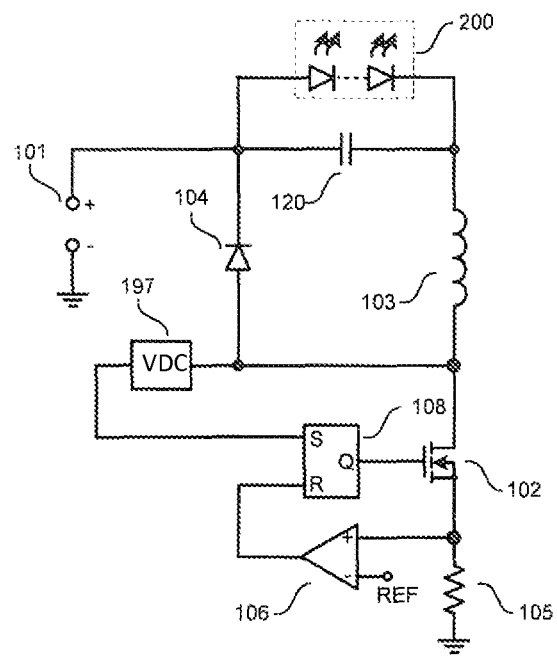
FIG. 1 depicts a prior-art current-programmed controlled buck converter operating in boundary conduction mode (BCM)

Referring to FIG. 1, a prior art LED driver of a buck type is shown. The LED driver is used to power a string of LEDs 200 at constant current. The driver circuit has an input voltage source 101, a controlled switch 102, a rectifier diode 104, an output filter inductor 103, and an output filter capacitor 120. The driver circuit also includes a control circuit, consisting of a current sense resistor 105, a comparator 106 with a reference voltage REF, a valley detector circuit 197, and a PWM flip-flop 108. In operation, the switch 102 is activated when a voltage valley of inductor 103 post-conduction oscillation is detected at the switch 102. The switch 102 is switched off, when the current sense signal at the resistor 105 meets the reference REF.

Figure 2:
FIG. 2 shows a waveform of the current in the inductor of the prior art LED driver of FIG. 1.

FIG. 2 shows a waveform 301 of the current in the inductor 103 of the prior art LED driver of FIG. 1. The average current value of the waveform 301 equals the DC current in the string of LEDs 200. The approximate average of the waveform 301 equals half of the voltage at REF divided by the resistance of 105. An error is contributed by the negative swing of the waveform 301.

Figure 3:
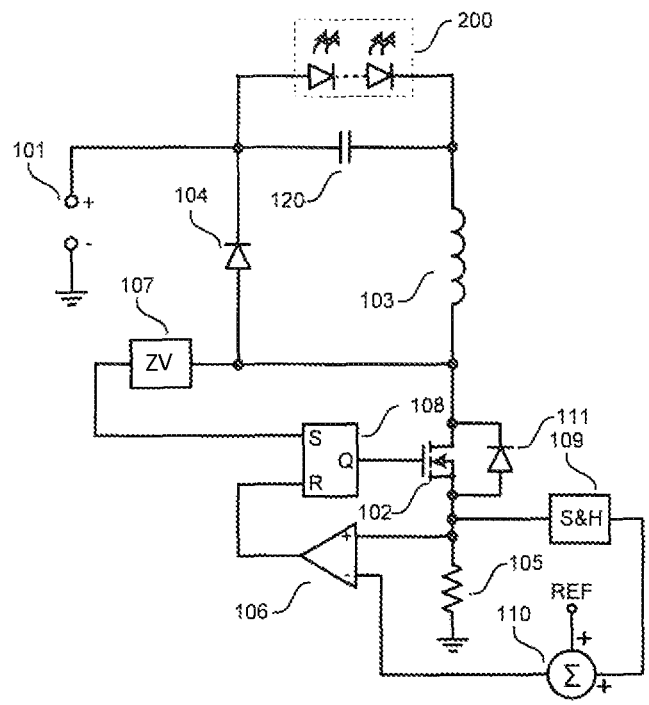
FIG. 3 depicts an LED driver of the present invention free of the negative swing error.

FIG. 3 depicts an LED driver of the present invention. The LED driver is free of the negative swing error. The LED driver includes a sample-and-hold circuit 109 and a summing node 110 which are added to the LED driver of FIG. 1. A diode 111 is shown explicitly and may represent a body diode of the switch 102. The valley detector circuit 197 is replaced by a zero-voltage (ZV) detector circuit 107.

The LED driver receives power from an input DC voltage source 101 and delivering regulated DC current to the string of LEDs 200. The circuit includes an inductor 103 having a first terminal attached to the LED string 200. A second terminal of the inductor 103 is attached to a first terminal of the controlled switch 102. A third terminal of the controlled switch 102 is attached to a current sensor resistor 105. An output filter capacitor 120 may be attached to the load 200. As shown in FIG. 3, the output filter capacitor 120 will have a first terminal and a second terminal attached to the first terminal and the second terminal respectively of the load 200. A catch diode 104 has a first terminal attached to the second terminal of the inductor 103 and a second terminal attached to the first terminals of the load 200 and the filter capacitor 120.

A control circuit is attached to a second and the third terminals of the controlled switch 102. The control circuit has a PWM latch 108. A set input of the PWM latch 108 is attached to a ZVD circuit 107. A reset input of the PWM latch 108 is attached to an output of a current sense comparator 106. The current sense comparator 106 has one input coupled to the third terminal of the controlled switch 102 and a second input attached to the summing node 110.

The LED driver further has a sample-and-hold circuit 109 having one terminal coupled to the third terminal of the controlled switch 102. A second terminal of the sample-and-hold circuit 109 is coupled to one input of the summing node 110. A second input of the summing node 110 is coupled to the reference voltage REF. A diode 111 is shown explicitly and may represent a body diode of the switch 102. The diode 111 is coupled to the first and third terminals of the controlled switch 102.

Figure 4:
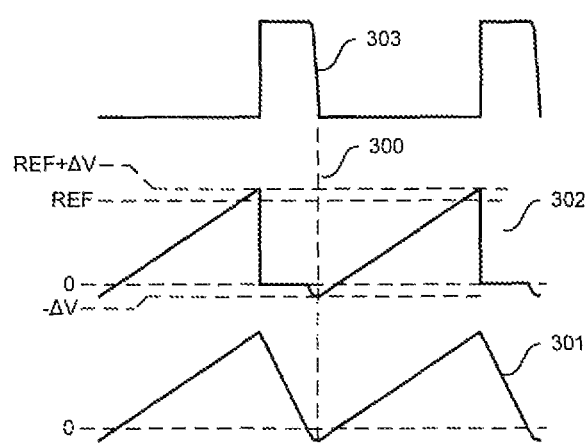
FIG. 4 illustrates operation of the LED driver of FIG. 3.

Referring to FIG. 4, waveforms illustrating operation of the LED driver of FIG. 3 are shown. Waveform 301 represents current in the inductor 103. Waveform 302 represents current sense voltage at the resistor 105. Waveform 303 represents voltage at the drain terminal of the switch 102. The voltage level $V_{IN}$-$V_O$ represents the difference between the input voltage $V_{IN}$ of the source 101 and the output voltage $V_O$ at the string of LEDs 200.

The time moment 300 designates the event of the voltage 303 falling below zero, such that the diode 111 conducts. While the diode 111 is conductive, the current sense voltage at the resistor 105 reflects the current 301. Generally, the resistor 105 does not carry current 301 while the switch 102 is non-conductive. However, when the diode 111 becomes forward-biased, the complete current of the inductor 103 becomes available for measuring at the sense resistor 105. The sample-and-hold circuit 109 samples the corresponding negative voltage drop $-\Delta V$ across the sense resistor 105. The switch 102 turns on followed by its turn-off once the current sense voltage 302 exceeds the reference voltage REF adjusted by $\Delta V$, i.e. REF+$\Delta V$.

Figure 5:
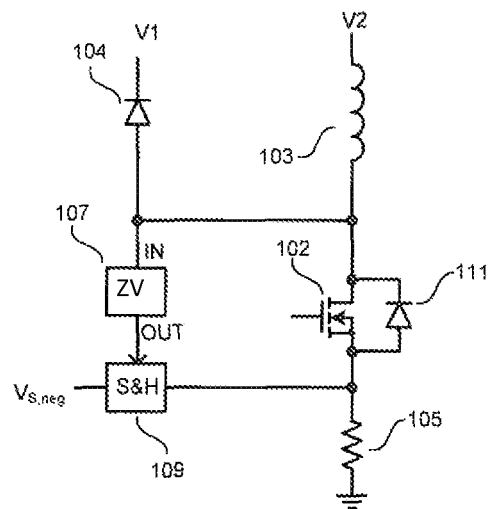
FIG. 5 depicts a generalized power converter topology of the present invention operating in boundary conduction mode (BCM)

Referring now to FIG. 5, a generalized power converter topology of the present invention operating in boundary conduction mode (BCM) is shown. The power converter topology comprises a switch 102. A first terminal of the switch 102 is coupled to a second terminal of an inductor 103. The inductor 103 has a first terminal coupled to a voltage V2. A diode 104 has a first terminal coupled to a voltage V1 and a second terminal coupled to a ZVD circuit 107. A current sense resistor 105 has a first terminal coupled to the third terminal of the switch 102 and a second terminal coupled to ground potential. A sample-and-hold circuit 109 is provided to sample negative current sense voltage at the resistor 105 when a zero-voltage condition is detected across the switch 102 by the ZVD circuit 107. A diode 111 may represent a body diode of the switch 102.

Figure 6:
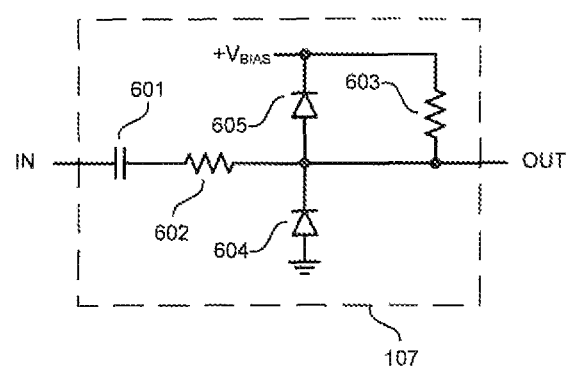
FIG. 6 shows one example of the ZVD circuit used in the power converter topology of FIG. 5.

Referring to FIG. 6, one example of the ZVD circuit 107 is shown. The ZVD circuit 107 has an input IN and an output OUT. A differentiator capacitor 601 has a first terminal coupled to the input IN and a second terminal coupled to a resistor 602. A second terminal of the resistor 602 is coupled to the output OUT. The resistor 602 can be added to limit the current in the capacitor 601. A pull-up resistor 603 has a first terminal coupled to the output OUT. A second terminal of the pull-up resistor is coupled to voltage $V_{BIAS}$. Diodes 604 and 605 can be added to limit voltage at the output node OUT. Diode 604 may have a first terminal coupled to ground potential and a second terminal coupled to the second terminal of the resistor 602 and the output OUT. The diode 605 may have a first terminal coupled to the second terminal of the diode 604, the second terminal of the resistor 602 and the output OUT. The second terminal of the diode 605 may be coupled to the voltage $V_{BIAS}$ and the second terminal of the pull-up resistor 603.

Figure 7:
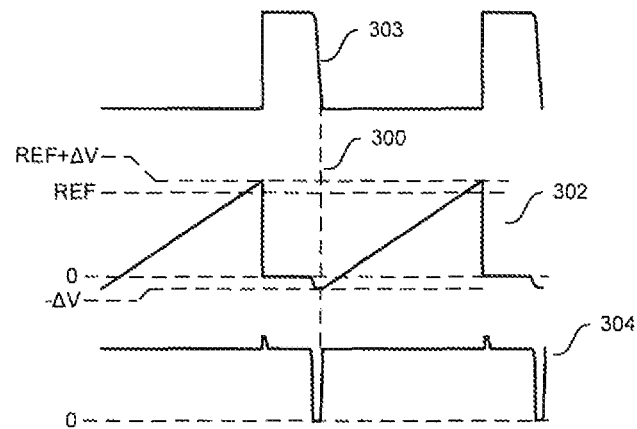
FIG. 7 illustrates operation of the power converter of FIG. 5 using the ZVD circuit of FIG. 6.

FIG. 7 illustrates operation of the power converter FIG. 5 using the ZVD circuit of FIG. 6. Waveform 302 represents current sense voltage at the resistor 105. Waveform 303 represents voltage at the drain terminal of the switch 102. The time moment 300 designates the event when voltage at the switch 102 drops to zero. While the switch 102 is conductive, the current sense voltage at the resistor 105 reflects the current 301.

Generally, the resistor 105 does not carry current 301 while the switch 102 is non-conductive. However, when the diode 111 becomes forward-biased, the complete current of the inductor 105 becomes available for measuring at the sense resistor 105.

A waveform 304 represents voltage at the output node OUT of the circuit 107. When the circuit 107 is implemented as shown in FIG. 6, the time moment 300 is detected as a rising edge of the voltage 304, generated by the pull-up resistor 603 once current in the differentiator capacitor 601 drops to zero abruptly. This moment occurs when the diode 111 conducts. The sample-and-hold circuit 109 samples the corresponding negative voltage drop $-\Delta V$ across the sense resistor 105 at the time moment 300.

Figure 8:
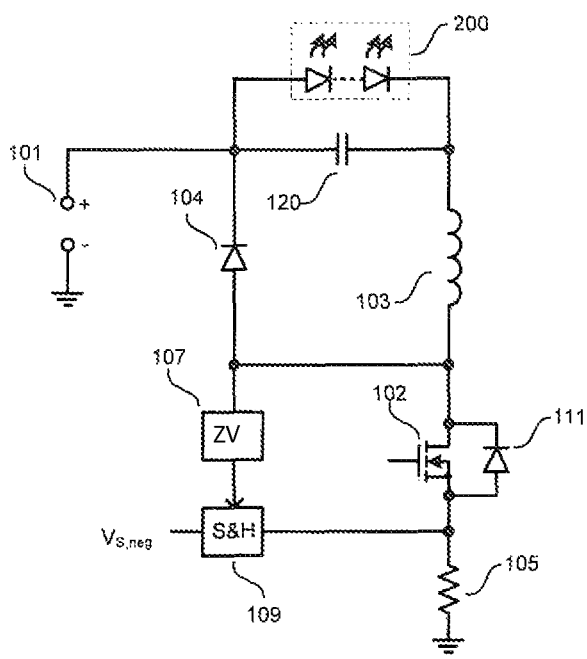
FIG. 8 depicts an exemplary buck converter embodiment of the generalized power converter of FIG. 5.

FIG. 8 depicts an exemplary buck converter embodiment of the generalized power converter of FIG. 5. The power converter receives power from an input DC voltage source 101 and delivering regulated DC current to the string of LEDs 200. The circuit includes an inductor 103 having a first terminal attached to the LED string 200. A second terminal of the inductor 103 is attached to a first terminal of the controlled switch 102. A third terminal of the controlled switch 102 is attached to a current sensor resistor 105. An output filter capacitor 120 may be attached to the load 200. The output filter capacitor 120 will have a first terminal and a second terminal attached to the first terminal and the second terminal respectively of the LED string 200. A catch diode 104 has a first terminal attached to the second terminal of the inductor 103 and to the ZVD circuit 107. A second terminal of the catch diode 104 is attached to the first terminals of the load 200 and the filter capacitor 120. The sample-and-hold circuit 109 is provided to sample negative current sense voltage at the resistor 105 when a zero-voltage condition is detected across the switch 102 by the ZVD circuit 107. A diode 111 may represent a body diode of the switch 102.

While embodiments of the disclosure have been described in terms of various specific embodiments, those skilled in the art will recognize that the embodiments of the disclosure can be practiced with modifications within the spirit and scope of the claims.

What is claimed is:

1. A switching power converter comprising:
   an input, voltage source;
   an output load coupled to the input voltage source;
   an inductive element coupled to the load;
   a switch coupled to the inductive element;
   a diode coupled to the inductive element and the input voltage source; and
   a control circuit coupled to the switch and the inductive element for activating and deactivating the switch, the control circuit activating and deactivating the switch based on a negative voltage drop across a resistive element of the control circuit;
   wherein the control circuit activates and then deactivates the switch once a current sense voltage across the resistive element exceeds a reference voltage adjusted by the negative voltage drop detected previously.

2. A switching power converter in accordance with claim 1, wherein the control circuit comprises:
   the resistive element having a first terminal coupled to the switch;
   a sample and hold circuit having a first terminal coupled to a first terminal of the resistive element;
   a summing node having a first input coupled to a second terminal of the sample and hold circuit and a second input coupled to a reference voltage;
   a comparator having a first input coupled to the first terminal of the resistive element and a second input coupled to an output of the summing node;
   a zero voltage detector circuit, having a first terminal coupled to the switch; and
   a flip-flop having a reset input coupled to an output of the comparator, a set input coupled to a second terminal of the zero voltage detector; and an output coupled to the switch.

3. A switching power converter in accordance with claim 2, wherein the control circuit further comprises a diode coupled across the switch.

4. A switching power converter in accordance with claim 1, wherein the control circuit comprises:
   the resistive element coupled to the switch;
   a sample and hold circuit coupled to the resistive element;
   a summing node coupled to the sample and hold circuit and to a reference voltage;
   a comparator coupled to the resistive element and to an output of the summing node;
   a zero voltage detector circuit, coupled to the switch; and
   a flip flop coupled to the comparator, to the zero voltage detector, and to the switch.

5. A switching power converter in accordance with claim 4, wherein the control circuit further comprises a diode coupled across the switch.

6. A switching power converter comprising:
   an input voltage source;
   an output load coupled to the input voltage source;
   an inductive element coupled to the load;
   a switch coupled to the inductive element; and
   a control circuit coupled to the switch and the inductive element for activating and deactivating the switch, the control circuit activating the switch once a zero voltage condition is detected at the switch and deactivating the switch when a current sense signal in a resistive element of the control circuit exceeds a reference voltage, the control circuit further activating and deactivating the switch based on a negative voltage drop across the resistive element of the control circuit;
   wherein the control circuit activates and then deactivates the switch once a current sense voltage across the resistive element exceeds a reference voltage adjusted by the negative voltage drop detected previously.

7. A switching power converter in accordance with claim 6 wherein the control circuit comprises:
   the resistive element coupled to the switch;
   a sample and hold circuit coupled to the resistive element;
   a summing node coupled to the sample and hold circuit and to a reference voltage;
   a comparator coupled to the resistive element and to an output of the summing node;
   a zero voltage detector circuit coupled to the switch; and
   a flip-flop coupled to the comparator, to the zero voltage detector, and to the switch.

8. A switching power converter in accordance with claim 7, wherein the control circuit further comprises a diode coupled across the switch.

9. A power converter comprising:
   an input voltage source;
   an output load coupled to the input voltage source;
   an inductive element coupled to the load;
   a switch coupled to the inductive element;
   a resistive element coupled to the switch;
   a sample and hold circuit coupled to the resistive element; and
   a zero voltage detector circuit coupled to the switch and to the sample and hold circuit;
   wherein the zero voltage detector (ZVD) circuit comprises:
      a differential capacitive element coupled to an input of the ZVD circuit; and
      a pull-up element coupled to an output of the ZVD circuit.

10. The power converter of claim 9, further comprising a body diode coupled across the switch.

11. The power converter of claim 9, further comprising a capacitive element coupled in parallel to the output load.

12. The power converter of claim 9, further comprising a diode coupled to the inductive element and the input voltage source.

13. The power converter of claim 9, wherein the pull-up element is a resistor connected to a pull-up voltage source.

14. The power converter of claim 9, further comprising a diode clamp for limiting voltage at the output of the ZVD circuit.

15. The power converter of claim 9, wherein the zero voltage detector circuit further comprises a resistive element coupled in series with the differential capacitive element.

* * * * *